United States Patent Office 3,508,399
Patented Apr. 28, 1970

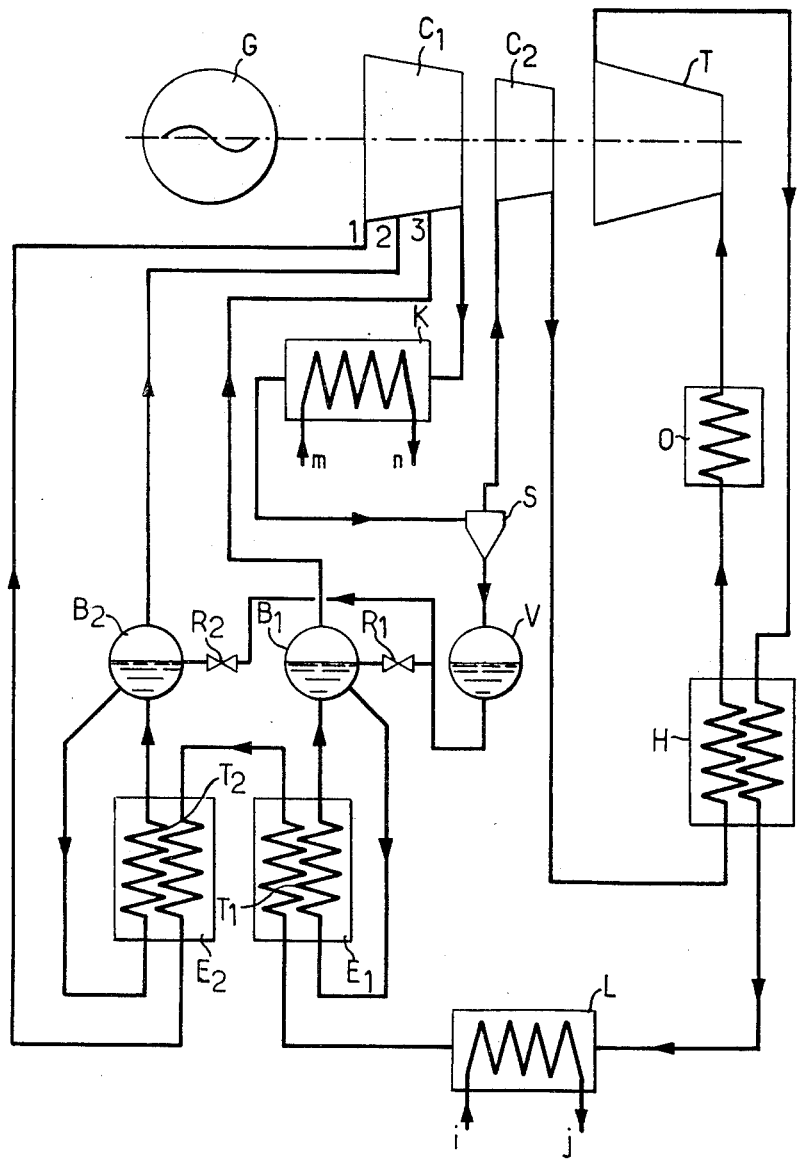

3,508,399
GENERATION OF ENERGY IN A CLOSED GAS CYCLE
Pierre Henri Pacault, Ville d'Avray, and Francis J. Mary, Paris, France, assignors to Babcock-Atlantique Société Anonyme, Paris, France, a corporation of France
Filed Jan. 3, 1969, Ser. No. 788,894
Claims priority, application France, Jan. 18, 1968, 136,465
Int. Cl. F01k 25/00, 25/06; F25b 25/00
U.S. Cl. 60—49                                      8 Claims

ABSTRACT OF THE DISCLOSURE

Apparatus for generation of energy in a closed gas cycle includes a compressor for a working fluid and a refrigerating machine operating in a gas cycle employing mechanical compression of a cold-producing fluid, which step is performed in the compressor for the working fluid. The two fluids may or may not be identical.

Background of the invention

The present invention relates to apparatus for generation of energy in a closed gas cycle and employs the subject matter described in U.S. patent application No. 788,748, filed in the applicants' name for "Generation of Energy in a Gas Cycle." In this other application there is described apparatus comprising the conventional elements consisting of a turbine, a compressor and a source of heat, and also means operating by compression, condensation, decompression and vapourisation of cold-producing fluid, to cool the working fluid prior to its infeed into the compressor.

The apparatus in accordance with this invention is particularly appropriate for power generating apparatus in a closed gas cycle, for example, employing a nuclear reactor as a heat source.

Summary

According to the invention apparatus for generation of energy in a closed gas cycle comprises a gas turbine, a compressor for a working fluid, a heat source with a regenerator, a refrigerating machine operating in a gas cycle employing mechanical compression of a cold-producing fluid, and means of performing a heat exchange between the working fluid and the cold-producing fluid, the compression of the cold-producing fluid being performed in the compressor for the working fluid.

In one form of the invention the working fluid and the cold-producing fluid are of the same nature. In this case, a part of the fluid compressed may be tapped off at the outlet of the compressor for the purpose of recycling the same to the compressor through a condensing, decompressing and vapourising circuit, the other part of the compressed fluid being conveyed to a heat source and to a decompressing turbine, to return to the compressor after having been cooled by heat exchange with the vapourised part.

Alternatively, the cold-producing fluid and the working fluid are different from each other. In this case, the fluids may be separated at the outlet of a lower stage of the compressor by condensation of the cold-producing fluid, and the cold-producing fluid and the working fluid recycled separately, the working fluid passing through the higher stage of the compressor before resuming its working cycle.

The decompression of the cold-producing fluid may occur with performance of work and partial phase shift in an auxiliary decompressing turbine, which is advantageous economically and is of interest moreover in that it reduces the portion of fluid vapourised by decompression, thus reducing the flow circulating in the cold-producing cycle.

Brief description of the drawings

FIGURE 3 illustrates a third embodiment in which the cold-producing fluid compressed with the working fluid is separated from the latter by condensation before continuing its decompression and vapourisation cycle.

Description of the preferred embodiments

The elements of identical nature have been marked by the same references in all three embodiments.

Figure 1:
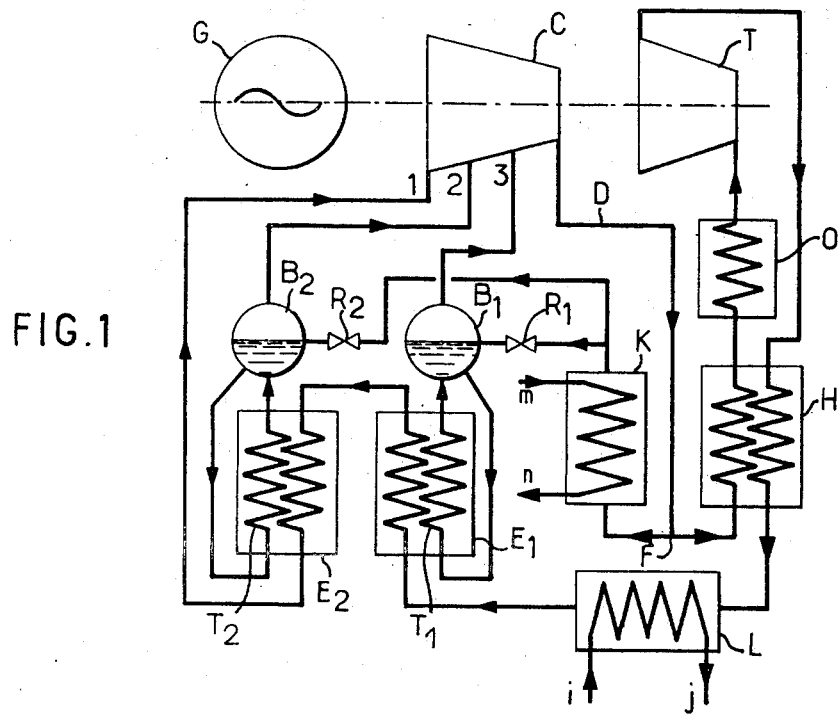
FIGURE 1 by way of example diagrammatically illustrates a gas turbine plant according to the invention, with take-off of cold-producing fluid on the duct feeding working fluid to the turbine.

In FIGURE 1, a gas turbine T drives a load G and a compressor C. Compressed carbon dioxide gas issuing from the compressor C through the duct D is fed to the turbine T through a regenerator H and a heat source O, such as in, for example, a nuclear reactor in which the gas circulates as a fuel coolant. The gas escaping from the turbine T after decompression, flows into the regenerator H to transmit its heat to the gas fed to the reactor, then returns to the compressor C at the intake point 1 after having been cooled successively in a water circulation exchanger L with water inlets and outlets at $i$ and $j$ respectively, and in two exchangers E1, E2 employing circulation of cold-producing fluid.

The cold-producing fluid is carbon dioxide gas drawn from the duct D at the point of bifurcation F. The gas thus drawn off is cooled and condensed in a water circulation exchanger K with water inlets and outlets at $m$ and $n$ respectively, and is then decompressed in parallel through two valves R1, R2 which feed two vessels B1, B2 respectively; these vessels B1, B2 are in communication with two intermediate stages 2 and 3 of the compressor C, and are thus subjected to different pressures. The liquid of the vessels B1, B2 flows in a closed circuit in nests of tubes T1, T2 respectively which are traversed within the exchangers E1, E2 by the exhaust gases of the turbine T; this liquid draws its heat of vapourisation from this gas, and is drawn into the compressor C after having been vapourised at saturation pressures corresponding to the intake stages 2 and 3.

The working fluid is thus cooled before returning to the compressor, by fluid of the same nature drawn off from the turbine feed duct D, and employed as a cold-producing fluid. The working fluid and the cold-producing fluid are compressed in one and the same apparatus, which is economically advantageous, in respect of installation costs as well as in respect of exploitation and power costs. Moreover, the working fluid allowed to enter the compressor at 1, is cooled several times therein after partial compression, by mixing with the cold-producing fluid allowed to enter at 2 and 3.

Figure 2:
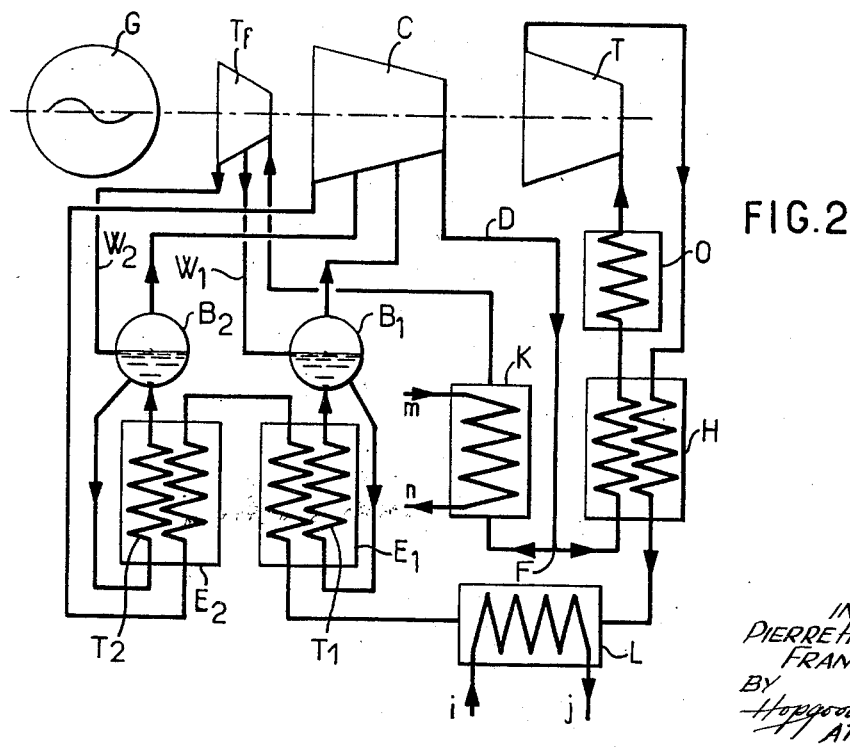
FIGURE 2 illustrates a second embodiment according to which the cold-producing fluid is decompressed under performance of work, in an auxiliary turbine.

The embodiment shown in FIGURE 2 comprises the same elements as the embodiment of FIGURE 1, but the cold-producing fluid issuing from the exchanger-condenser K is decompressed whilst performing work in an auxiliary turbine T$f$, the throughflow valves R1, R2 being eliminated. The decompression occurs with partial phase change. A part of the fluid reaches the vessel B1 through the duct W1 after partial decompression and the remainder is fed to the vessel B2 through the duct W2 after complete decompression. As stated above, the decompression whilst performing work generates less vapour than decompression by flow-through; this renders it possible to reduce the rate of flow of cold-producing fluid to be drawn off at F.

In the embodiment shown in FIGURE 3, the working fluid and the cold-producing fluid are different from each other, one being, for example, carbon dioxide gas, and the other nitrogen. The turbine T drives a load G and a compressor havin gtwo stages C1, C2 which do not communicate directly with each other. The lower stage C1 receives nitrogen at the lower intake point 1 and carbon dioxide gas at the intermediate intake points 2 and 3. The compressed mixture issuing from the stage C1 passes through an exchanger-condenser K. The liquid carbon dioxide is separated from the nitrogen in the separator S, and is collected in the vessel V. It then returns to the intake stages 2 and 3 after having passed through two parallel throughflow-decompression and vapourisation circuits comprising the same elements R1, B1, E1, T1; R2, B2, E2, T2 respectively, as in the case of FIGURE 1.

The nitrogen separated from the carbon dioxide in S passes through the higher compression stage C2, then flows in the regenerator H and the heat source O, is decompressed in the turbine T and returns to the compressor C1 through the regenerator H and coolers L, E1 and E2.

The apparatus shown in FIGURE 3 thus offers the advantages of that of FIGURE 1, whilst rendering it possible to select the most appropriate working and cold-producing fluids required for a particular application.

The invention is not limited by the specific details of embodiments described above. For example, the auxiliary turbine Tƒ incorporated in the apparatus of FIGURE 2 may be substituted for the valves R1, R2 of FIGURE 3. Also, the embodiments of FIGURES 1 and 2 may be modified by replacing their single compressor C with a compressor comprising several stages C1, C2 and employing intermediate cooling.

We claim:
1. Apparatus for generation of energy in a closed gas cycle comprising a gas turbine, a compressor for a working fluid, a heat source with a regenerator, a refrigerating machine operating in a gas cycle employing mechanical compression of a cold-producing fluid, and means of performing a heat exchange between the working fluid and the cold-producing fluid, the compression of the cold-producing fluid being performed in the compressor for the working fluid.

2. Apparatus according to claim 1, in which the cold-producing fluid is of the same nature as the working fluid, the delivery at the outlet of the compressor being divided into a flow of working fluid and a flow of cold-producing fluid.

3. Apparatus according to claim 2, in which the working fluid and the cold-producing fluid are both carbon dioxide gas.

4. Apparatus according to claim 2, in which at least a part of the delivery of cold-producing fluid is returned to the compressor at an intermediate intake stage.

5. Apparatus according to claim 1, in which the refrigerating machine comprises an auxiliary turbine for decompression of the cold-producing fluid.

6. Apparatus according to claim 5, in which the auxiliary turbine had at least one intermediate draw-off point at a partial decompression stage, in communication with an intermediate intake stage of the compressor.

7. Apparatus according to claim 1, in which the working fluid and the cold-producing fluid are compressed in the state of a mixture, the cold-producing fluid being separated by condensation at the outlet of the compressor.

8. Apparatus according to claim 7, including a second compressor receiving the working fluid freed of the condensed cold-producing fluid and subjecting it to complementary compression.

References Cited
UNITED STATES PATENTS 1,440,000  12/1922  Bonine.
3,171,268  3/1965  Silver.

MARTIN P. SCHWADRON, Primary Examiner

R. R. BUNEVICH, Assistant Examiner

U.S. Cl. X.R.

60—36, 59; 62—467